UNITED STATES PATENT OFFICE.

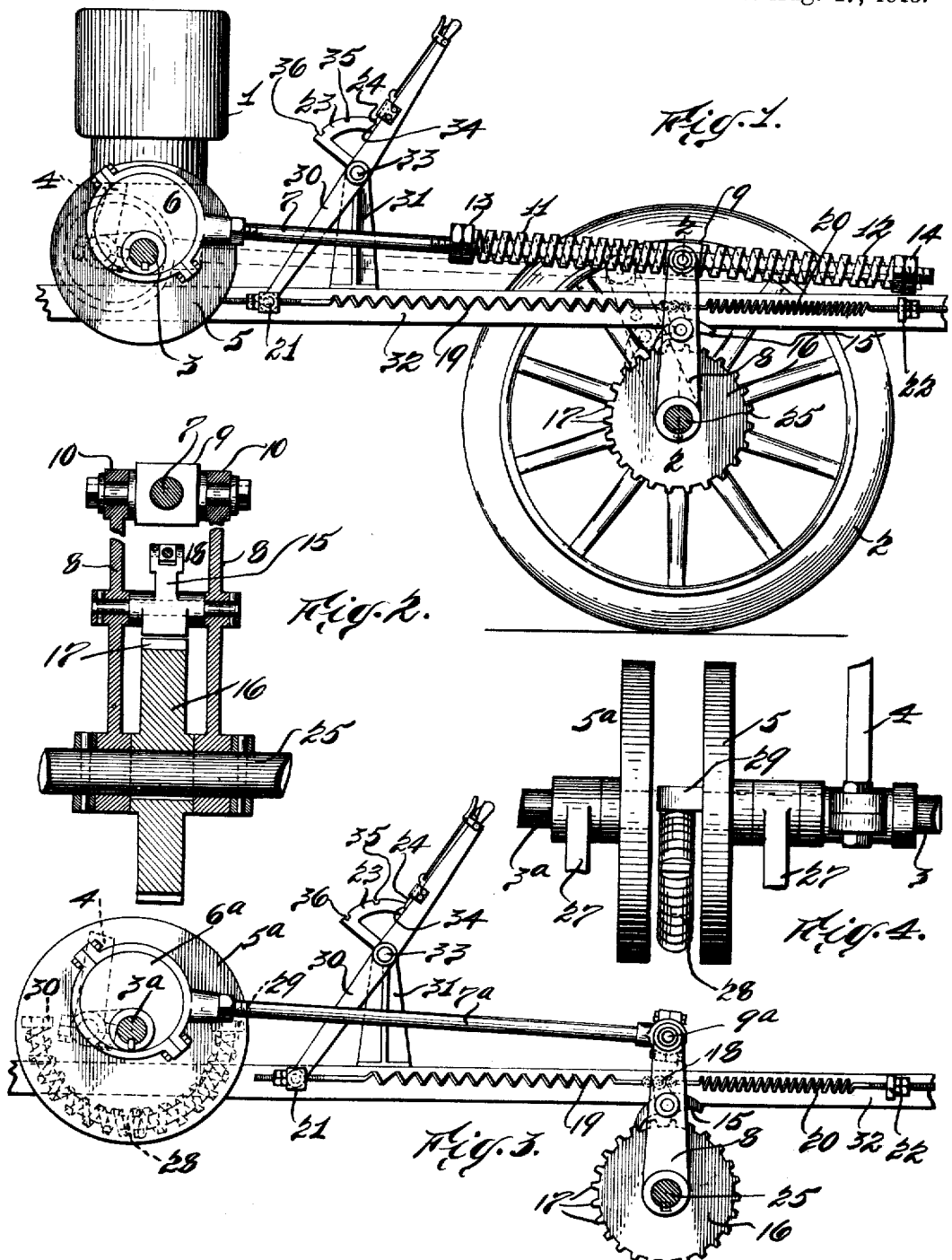

CHARLES A. WARD, OF NEW YORK, N. Y.

VARIABLE-TORQUE TRANSMISSION DEVICE.

1,150,235.  Specification of Letters Patent.  Patented Aug. 17, 1915.

Application filed August 17, 1912. Serial No. 715,535.

*To all whom it may concern:*

Be it known that I, CHARLES A. WARD, a citizen of the United States, residing at New York city, New York, have invented certain new and useful Improvements in Variable-Torque Transmission Devices, of which the following is a clear, full, and exact description.

This invention relates to a variable torque transmission device for the purpose of employing a constant power against variable loads.

Although the field of application of this invention has very wide limits, it will be sufficient for the present purposes to show its application in obtaining a variable torque suitable for use in driving motor vehicles. In such an application the present improvement may be regarded as a variable torque transmitting device and will be readily recognized as a simple substitute for the ordinary cumbersome gear-changing devices now employed in the driving mechanism of motor vehicles.

One of the principal characteristics and advantages of the present gear-changing device however, is that it acts automatically to vary the torque upon the driving wheel in accordance with the load or resistance offered.

This invention may be embodied in various equivalent forms, and I have chosen merely a preferred form for the purposes of illustration in the accompanying drawings, in which—

Figure 1 is a side elevation of the entire mechanism; Fig. 2 is a cross-section through the line 2—2 of Fig. 1; Fig. 3 is a side elevation of a modified form of the mechanism; Fig. 4 is a partial end view of the modification shown in Fig. 3.

Referring more particularly to the drawings, 1 indicates a driving element which, in the present instance, may be an ordinary gas engine.

2 indicates a driven element which may be the driving wheel of a motor vehicle.

The connections from the driving element to the driven element may be widely varied, and in carrying out the present invention there is interposed somewhere in said connections a resilient element in the form of a compressible spring or otherwise, to enable said driving element to apply greater or less torque upon said wheel in accordance with the load carried or resistance offered.

The engine 1 is shown provided with a piston-rod 4 connected for driving a rotating shaft 3. A suitable fly-wheel 5 may be carried on the shaft 3, and a rod 7 may be reciprocated from said shaft 3 by means of a strap and eccentric 6. The reciprocating rod 7 is slidably connected in any suitable way with the upper end of an arm or pawl carrier 8 preferably forked and mounted to swing upon the axis 25 of the wheel 2. In the present form, the outer end of the rod 7 extends loosely through a block 9 carried in pivotal bearings 10 at the upper end of the forked arm or pawl carrier 8. Mounted on the rod 7 at each side of the block 9 are coiled springs 11 and 12. The outer ends of the springs 11 and 12 bear against fixed abutments 13 and 14 respectively, while their inner ends bear with yielding pressure against opposite sides of the block 9 upon the arm 8. The abutments 13 and 14 are preferably in the form of adjustable locknuts for adjusting the tension of the springs 11 and 12 against the intermediate arm 8, as may be desired. By this construction the arm 8 is adapted to be oscillated by the reciprocating rod 7.

The driven wheel 2 may be provided with any suitable clutch member such as ratchet 16 fixed thereto having teeth 17 as shown, and the swinging arm 8 may also be suitably provided with a coöperating clutch member in the form of a pawl 15 adapted to engage the teeth 17 of ratchet 16 and allow the arm 8 to drive the wheel 2 in an obvious manner. The pawl 15 may also be in the form of a double-ended pawl as shown, so as to engage and drive the teeth 17 and ratchet 16 in either direction during the swinging of said arm 8. This pawl as shown in Fig. 2 is pivoted within the side pieces of the forked arm 8, and its upper end 18 is preferably connected at one side by an elastic spring 19 to the lower end 21 of a hand-lever 30. The other side of the end 18 is preferably connected by an elastic spring 20 to a fixed abutment 22 carried on the frame 32 of the machine. The hand-lever 30 is pivotally mounted at 33 upon the standard 31 carried on frame 32, and said hand-lever is provided with the suitable latch bolt 24 for holding the same in different notches of a quadrant 23. The connections are such that when this lever 30 is in its midway position in notch 35 of the quadrant, the spring 19 balances spring 20 and holds the pawl 15 in midway position so as to be entirely disengaged from the ratchet teeth 17, but when lever 30 is thrown to the notch 34 of the quadrant as shown, greater tension is placed upon spring 19 and the pawl 15 is consequently thrown into position for driving ratchet 17 in the forward direction. The position of the lever 30 at the notch 36 would of course allow spring 20 to overbalance spring 19 and reverse the position of the pawl 15 for driving the wheel in an opposite direction. It should be here explained that there is sufficient tension upon the springs 19 and 20 in all positions of the lever 30 that either spring when in position to hold the pawl engaged with its ratchet, is not sufficiently effected by the oscillation of arm 8 to release said pawl.

It should be understood that the springs 11 and 12 are of sufficient strength and capacity to carry arm 8 the full stroke of rod 7 under light loads, but that under heavy loads or when great resistance is offered by wheel 2, the spring 11 or 12, as the case may be, is compressed at each driving part of its reciprocation sufficiently to shorten the stroke of arm 8, whereby the pawl 16 will drive the ratchet the space of one or two teeth instead of three or four, thus varying the effective stroke of the reciprocating mechanism or rod 7. In this way the gear ratio between the driving shaft 3 and the driven wheel 2 is automatically varied in accordance with the load carried or resistance offered by said wheel 2. Various gripping devices other than that shown may be employed for engaging the driven member 16 for long or short strokes.

The modification shown in Fig. 3 is similar in most respects to the form above described except that the resilient member or compression spring for varying the stroke of arm 8 is differently arranged. In this form the driving shaft is broken and provided with separate disks 5 and 5ᵃ adjacently disposed and which may serve as flywheels. The driving disk 5 is provided with a lug 29, and the driven disk is provided with a lug 30 spaced therefrom. Between the lug 30 and 29 is mounted a coiled spring 28 acting similarly to the springs 11 and 12 of Fig. 1, except that since the compression is here in one direction, during both movements of the reciprocating rod 7, a single spring suffices. It is obvious that such spring means, active during either the forward or rearward movement of the driven wheel may be interposed in a variety of places between the driving element 1 and the driven element 2 for obtaining the advantages and results of the present invention.

The operation of the present improvement and the principles involved will be clearly understood from the foregoing description and may be briefly recited as follows: During normal load or resistance upon the driven wheel 2 such as when traveling on the level, the reciprocating rod 7 carries oscillating arm 8 during the full length of its stroke. The springs 12 and 11 are designed for this purpose and carry the arm 8 with the rod 7 practically without any compression. The full stroke of the oscillating arm 8 is adapted to carry the ratchet through the space of any suitable number of teeth, as for instance four. Under these conditions the driven wheel 2 may be considered as operating under its highest speed. When a load is encountered or resistance to the wheel 2 offered, as for instance in climbing a hill, the engine will reciprocate the rod 7 through the same length of stroke, but since the resistance of arm 8 has increased, the spring 12 will compress more or less at each stroke and thus the arm 8 will not be carried through the space of as many teeth as when under a light load. Consequently each stroke of the engine will drive the wheel 2 through a shorter space as for instance two teeth, and this may be considered the low speed or low gear. It will be obvious that when the spring 12 (or spring 11 when reversing) is compressed to carry the arm 8 through a shorter space, a correspondingly greater pressure is applied to said arm 8 for obtaining the necessary increased torque upon the wheel 2. In this way when the torque is increased, the speed is decreased and vice versa.

The advantages of this improvement will be readily appreciated when used in connection with motors of the hydrocarbon type. As is well-known, these motors develop their best efficiency when run at a constant and comparatively high speed. The horsepower of any gas engine is necessarily limited and any great variation in load is always taken care of by change of gear ratio between the engine and the driving wheels. In the present apparatus this change of gear ratio takes place automatically, allowing an engine of any stated horsepower to run constantly at its most efficient speed.

The term "power" as used in the claims of course indicates the application of mechanical force at a certain rate in the performance of work, and is usually termed "horsepower."

What I claim is:

1. In a variable torque transmission device, in combination, a source of limited power and a driving shaft operated therefrom, a variably resisting member, means for driving said wheel from said shaft at speeds relative to said shaft which vary inversely with the resistance offered by said wheel, said means comprising a reciprocating rod operated from said shaft, an oscillating arm pivoted at the axis of said wheel so as to swing in its forward and backward strokes concentrically with said wheel and having provision at its outer end for slidably supporting the reciprocating rod, intermittently acting clutch means between said arm and said wheel for driving said wheel, hand-actuated means for controlling the operation of said clutch means during the oscillation of said arm, a power transforming spring mounted on said rod and bearing at all times directly against said oscillating arm so as to act with greater pressure against said arm in moving the same a shorter distance when more resistance is offered by said wheel than when less resistance is offered by said wheel.

2. In a variable torque transmission device, in combination, a source of limited power and a driving shaft operated therefrom, a variably resisting member, means for driving said wheel from said shaft at speeds relative to said shaft which vary inversely with the resistance offered by said wheel, said means comprising a reciprocating rod operated from said shaft, an oscillating arm pivoted at the axis of said wheel so as to swing in its forward and backward strokes concentrically with said wheel and having provision at its outer end for slidably supporting the reciprocating rod, intermittently acting clutch means between said arm and said wheel, said clutch means being operable to drive said wheel in either direction, hand-actuated means for controlling the operation of said clutch means during the oscillation of said arm, and power transforming springs mounted on said rod and bearing at all times directly against said oscillating arm, one spring at each side of said arm so that each spring in operating against said arm acts with greater pressure against said arm in moving the same a shorter distance when more resistance is offered by said wheel than when less resistance is offered by said wheel.

3. In a variable torque transmission device, in combination, a source of limited power and a driving shaft operated therefrom, a variably resisting member, means for driving said wheel from said shaft at speeds relative to said shaft which vary inversely with the resistance offered by said wheel, said means comprising a reciprocating rod operated from said shaft, an oscillating arm pivoted at the axis of said wheel so as to swing in its forward and backward strokes concentrically with said wheel and having provision at its outer end for slidably supporting the reciprocating rod, a ratchet fixed to said wheel and a double ended pawl mounted on said arm for intermittently engaging said ratchet to drive said wheel in either direction, hand-actuated means for controlling the operation of said pawl during the oscillation of said arm so as to either disengage it from said ratchet entirely or to engage it with said ratchet on either the forward or backward strokes of said arm, and power transforming springs mounted on said rod and bearing at all times directly against said oscillating arm, one spring at each side of said arm so that each spring in operating on said arm acts with greater pressure against said arm in moving the same a shorter distance when more resistance is offered by said wheel than when less resistance is offered by said wheel.

Signed at New York, N. Y., this 13th day of August, 1912.

CHARLES A. WARD.

Witnesses:
ABRAM BERNSTEIN,
FLORENCE JACKSON.

It is hereby certified that in Letters Patent No. 1,150,235, granted August 17, 1915, upon the application of Charles A. Ward, of New York, N. Y., for an improvement in "Variable-Torque Transmission Devices," an error appears in the printed specification requiring correction as follows: Page 3, line 58, claim 3, for the word "strikes" read *strokes;* and that the said Letters Patent should be read with this correction therein that the same may conform to the record of the case in the Patent Office.

Signed and sealed this 7th day of September, A. D., 1915.

[SEAL.]

J. T. NEWTON,

*Acting Commissioner of Patents.*